US007495418B2

(12) United States Patent
Yano et al.

(10) Patent No.: US 7,495,418 B2
(45) **Date of Patent: *Feb. 24, 2009**

(54) SEMICONDUCTOR APPARATUS FOR CHARGING CAPACITORS

(75) Inventors: Koichi Yano, Kanagawa (JP); Akihiko Fujiwara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 246 days.

This patent is subject to a terminal disclaimer.

(21) Appl. No.: 11/085,107

(22) Filed: Mar. 22, 2005

(65) Prior Publication Data

US 2005/0231173 A1 Oct. 20, 2005

(30) Foreign Application Priority Data

Mar. 23, 2004 (JP) ............................ 2004-084620

(51) Int. Cl.
*H02J 7/00* (2006.01)

(52) U.S. Cl. ........................................ 320/166; 327/81

(58) Field of Classification Search ................. 320/166, 320/116, 122, 158; 324/658; 327/74, 81, 327/91

See application file for complete search history.

(56) References Cited

U.S. PATENT DOCUMENTS 4,948,954 A 8/1990 Dias
5,528,121 A * 6/1996 Okamura .................... 320/167
5,537,076 A 7/1996 Fujii
5,631,537 A * 5/1997 Armstrong .................. 320/118
5,734,205 A * 3/1998 Okamura et al. ............ 307/110
5,844,792 A * 12/1998 Moreau ....................... 363/89
5,905,361 A * 5/1999 Saeki et al. ................. 320/119
5,982,050 A * 11/1999 Matsui ...................... 307/10.7
5,998,969 A 12/1999 Tsuji et al.
6,133,710 A 10/2000 Okamura
6,225,781 B1 * 5/2001 Okamura et al. ............ 320/122
6,240,101 B1 5/2001 Co et al.
6,297,616 B1 * 10/2001 Kubo et al. ................. 320/116
6,316,915 B1 * 11/2001 Fujiwara et al. ............. 320/134
6,316,917 B1 * 11/2001 Ohta .......................... 320/166
6,323,623 B1 * 11/2001 Someya et al. .............. 320/166
6,586,910 B2 * 7/2003 Matsui et al. ............... 320/122
7,034,580 B2 * 4/2006 Yano et al. .................... 327/74
2004/0027759 A1 * 2/2004 Katoh ....................... 361/93.7

FOREIGN PATENT DOCUMENTS

JP 2000-50495 2/2000

* cited by examiner

*Primary Examiner*—Akm E Ullah
*Assistant Examiner*—M'baye Diao
(74) *Attorney, Agent, or Firm*—Oblon, Spivak, McClelland, Maier & Neustadt, P.C.

(57) ABSTRACT

A semiconductor apparatus is disclosed, including: multiple parallel monitor circuits each configured to control charge to a capacitor by controlling a transistor that bypasses, if the voltage of the capacitor exceeds a predetermined reference voltage, charge current provided to the capacitor. The semiconductor apparatus further includes high voltage side IC connection output terminals each connected to an open drain of N channel transistor; high voltage side IC connection input terminals each connected to a terminal of a high resistance component and to an inverter input terminal; low voltage side IC connection output terminal each connected to an open drain of P channel transistor; and low voltage side IC connection input terminal each connected to a terminal of a high resistance component and to an inverter input terminal.

15 Claims, 9 Drawing Sheets

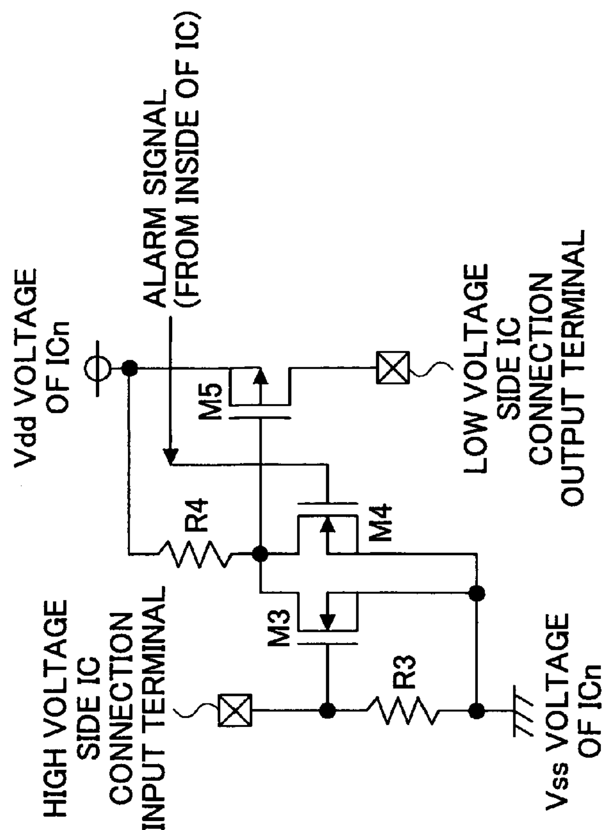
FIG.2B
DOWNSTREAM SIGNAL CIRCUIT
Vdd VOLTAGE OF ICn
ALARM SIGNAL (FROM INSIDE OF IC)
M5
R4
M4
M3
R3
HIGH VOLTAGE SIDE IC CONNECTION INPUT TERMINAL
LOW VOLTAGE SIDE IC CONNECTION OUTPUT TERMINAL
Vss VOLTAGE OF ICn

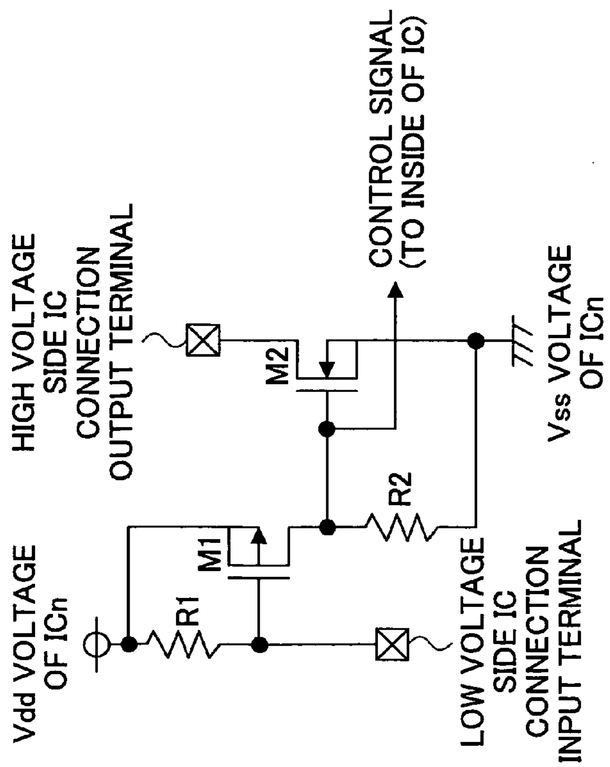
FIG.2A
UPSTREAM SIGNAL CIRCUIT
Vdd VOLTAGE OF ICn
R1
M1
HIGH VOLTAGE SIDE IC CONNECTION OUTPUT TERMINAL
M2
R2
CONTROL SIGNAL (TO INSIDE OF IC)
LOW VOLTAGE SIDE IC CONNECTION INPUT TERMINAL
Vss VOLTAGE OF ICn UPSTREAM SIGNAL CIRCUIT CONNECTION
Vdd VOLTAGE OF MONITOR IC2
MONITOR IC2
TO CON12 OF MONITOR IC3
CONTROL SIGNAL (TO INSIDE OF MONITOR IC2)
Vss VOLTAGE OF ICn+1
M22
M21
R21
R22
CON12
CON1
Vdd VOLTAGE OF MONITOR IC1
M12
M11
R11
R12
CONTROL SIGNAL (TO INSIDE OF MONITOR IC1)
Vss VOLTAGE OF MONITOR IC1
CON12
TO CONTROL CIRCUIT
MONITOR IC1

DOWNSTREAM SIGNAL CIRCUIT CONNECTION
Vdd VOLTAGE OF MONITOR IC2
ALARM SIGNAL
(FROM INSIDE OF MONITOR IC2)
CON8
M25
R24
M24
M23
R23
TO CON8 OF
MONITOR IC3
CON5
MINOTOR IC2
Vdd VOLTAGE OF MONITOR IC1
ALARM SIGNAL
(FROM INSIDE OF MONITOR IC1)
CON8
M15
R14
M14
TO CONTROL CIRCUIT
MONITOR IC1
M13
R13
CON5
Vss VOLTAGE OF MONITOR IC1

UPSTREAM SIGNAL CIRCUIT

DOWNSTREAM SIGNAL CIRCUIT

UPSTREAM SIGNAL CIRCUIT

DOWNSTREAM SIGNAL CIRCUIT

SEMICONDUCTOR APPARATUS FOR CHARGING CAPACITORS

BACKGROUND OF THE INVENTION

1. Field of the Invention

The present invention generally relates to a semiconductor apparatus for charging a capacitor, and more particularly, to a semiconductor apparatus in which multiple parallel monitor circuits are integrated for evenly charging multiple electric double layer capacitors connected in series.

2. Description of the Related Art

An electric double layer capacitor can be charged more quickly than a secondary battery is. Additionally, an electric double layer capacitor can store more energy than a secondary battery can. Since the rated voltage of an electric double layer capacitor is about 2.7 V, if a higher voltage is required, multiple capacitors connected in series are used.

When multiple capacitors connected in series are charged, uneven charging of the capacitors may occur due to the diversity of capacitance of each capacitor, self-charging, and self-discharging.

A circuit called "parallel monitor" for evenly charging multiple capacitors is used to solve the above problem.

FIG. 4 is a circuit diagram showing a portion of a parallel monitor circuit disclosed in Japanese Patent Laid-Open Application No. 2000-050495.

The same parallel monitor as shown in FIG. 4 is provided to each one of multiple capacitors connected in series. The parallel monitor is described below with reference to FIG. 4.

The parallel monitor circuit shown in FIG. 4 includes reference voltages Vr1 and Vr2, a comparator circuit CMP for comparing the voltage of a capacitor C1 with the reference voltage Vr1 or Vr2, switches S1 and S2 for switching the reference voltages Vr1 and Vr2, a transistor Tr1 for bypassing the charge current that flows into the capacitor C1, and a switch control circuit for controlling the switches S1 and S2 in accordance with the output of the comparator circuit CMP.

The reference voltage Vr1 is set at 3 V which is the full charge voltage of the capacitor C1, and the reference voltage Vr2 is set at 0.8 V which is less than the full charge voltage of the capacitor C1. At the initial stage of charge, the switch S1 is connected to the reference voltage Vr2. When the voltage of the capacitor C1 increases up to 0.8 V, the output of the comparator circuit CMP is inverted, and turns on the transistor Tr1. When the transistor Tr1 is turned on, the capacitor C1 is discharged, and the time constant of the discharge is determined by the resistance component of the circuit including the transistor Tr1. The switch control circuit monitors the outputs of all comparator circuits CMP. While the capacitor C1 is discharged, if the charge voltage of another capacitor increases up to the reference voltage 0.8 V, the switch S1 is switched to the reference voltage Vr1, and bypass mode is discharged. The capacitors are charged up to the full charge voltage 3 V.

As described above, the quantity of the parallel monitor circuits required is equal to the number of capacitors that are connected in series. The scale of the entire parallel monitor circuits become large. However, the conventional parallel monitor circuits have not integrated in a semiconductor apparatus but assembled using discrete components. The scale of the conventional parallel monitor circuits are large, and their cost is high. The integration of the parallel monitor circuits are desired to solve the above problem.

However, the quantity of capacitors connected in series depends on their application. It is not practical to design and manufacture a semiconductor apparatus in which the suitable number of parallel monitor circuits are integrated for each application.

It is also not advantageous to make a semiconductor apparatus in which only one parallel monitor circuit is integrated.

To solve above problem, five through ten parallel monitor circuits are integrated in a semiconductor apparatus IC1 (five in the case of FIG. 1) as shown in FIG. 1. If there are capacitors more than the parallel monitor circuits integrated in one semiconductor apparatus that are to be charged, the semiconductor apparatuses are cascaded as many as necessary. According to the above arrangements, the reasonable number of parallel monitor circuits can be integrated in a semiconductor apparatus so as to increase the efficiency of integration and consequently to reduce the cost of the parallel monitor circuits.

Even in the case in which multiple parallel monitor circuits are integrated in one semiconductor apparatus (hereinafter referred to as a monitor IC), the control circuit for monitoring the output of the comparator circuit CMP and for switching the reference voltages is configured by a CPU, for example, and the control circuit is usually separate from the semiconductor apparatus as shown in FIG. 4.

In the case of multiple monitor ICs are cascaded (two in the case of FIG. 1), the voltage applied to the power supply voltages Vdd (plus) and Vss (minus) of each monitor IC may be different. As a result, the voltage level of signal lines for exchanging signals with the control circuit may differ for each monitor IC. It is impossible to directly connect the control circuit and all monitor ICs.

This problem can be solved by a technique in which wiring is made between the control circuit and the monitor IC1, the minus power supply voltage Vss of which is common to the minus power supply voltage Vss of the control circuit, and the monitor IC1 shifts the voltage level of the control signal, and the control signal line is connected from the terminal of the monitor IC1 to the terminal of the monitor IC2 as shown in FIG. 1. This connection technique is referred to as daisy chain.

However, as apparent from FIG. 1, since the plus power supply voltage Vdd of the monitor IC1 is the minus power supply voltage Vss of the monitor IC2, voltage between the minus power supply voltage Vss of the monitor IC1 and the plus power supply voltage Vdd of the monitor IC2 is applied to terminals CON1 through CON12 that connects the monitor IC1 and the monitor IC2. As a result, the monitor IC1 and monitor IC2 need to have withstanding voltage twice as high as the power supply voltage of the monitor IC in the case in which one monitor IC charges one capacitor. Since a high withstanding voltage transistor is larger than a low withstanding voltage transistor, the chip size and cost of the monitor IC is increased.

SUMMARY OF THE INVENTION

Accordingly, it is a general object of the present invention to provide a novel and useful semiconductor apparatus in which at least one of the above problems is eliminated.

Another and more specific object of the present invention is to provide a semiconductor apparatus for charging a capacitor that can be used without increasing its withstanding voltage.

To achieve at least one of the above objects, a semiconductor apparatus according to the present invention, includes:

a plurality of parallel monitor circuits each configured to control charge to a capacitor by controlling a transistor that bypasses, if the voltage of the capacitor exceeds a predetermined reference voltage, charge current provided to the capacitor;

a plurality of high voltage side IC connection output terminals each connected to an open drain of N channel transistor;

a plurality of high voltage side IC connection input terminals each connected to a terminal of a high resistance component, an opposite terminal of which is connected to a minus power supply of the semiconductor apparatus, and to an inverter input terminal;

a plurality of low voltage side IC connection output terminal each connected to an open drain of P channel transistor; and a plurality of low voltage side IC connection input terminal each connected to a terminal of a high resistance component, an opposite terminal of which is connected to a plus power supply of the semiconductor apparatus, and to an inverter input terminal, wherein in the case in which the open drain of the N channel transistor of the high voltage side IC connection output terminal is turned on, the high voltage side IC connection output terminal becomes the minus power supply voltage of the semiconductor apparatus; and in the case in which a low signal is input to the low voltage side IC connection input terminal, a little current flows the high resistance component connected to the plus power supply of the semiconductor apparatus, and a low signal is input to the inverter input.

Other objects, features, and advantages of the present invention will become more apparent from the following detailed description when read in conjunction with the accompanying drawings.

BRIEF DESCRIPTION OF THE DRAWINGS

FIGS. 2A and 2B are circuit diagrams showing the construction of control terminals according to an embodiment;

DETAILED DESCRIPTION OF THE PREFERRED EMBODIMENTS

The preferred embodiments of the present invention are described in detail below.

Figure 1:
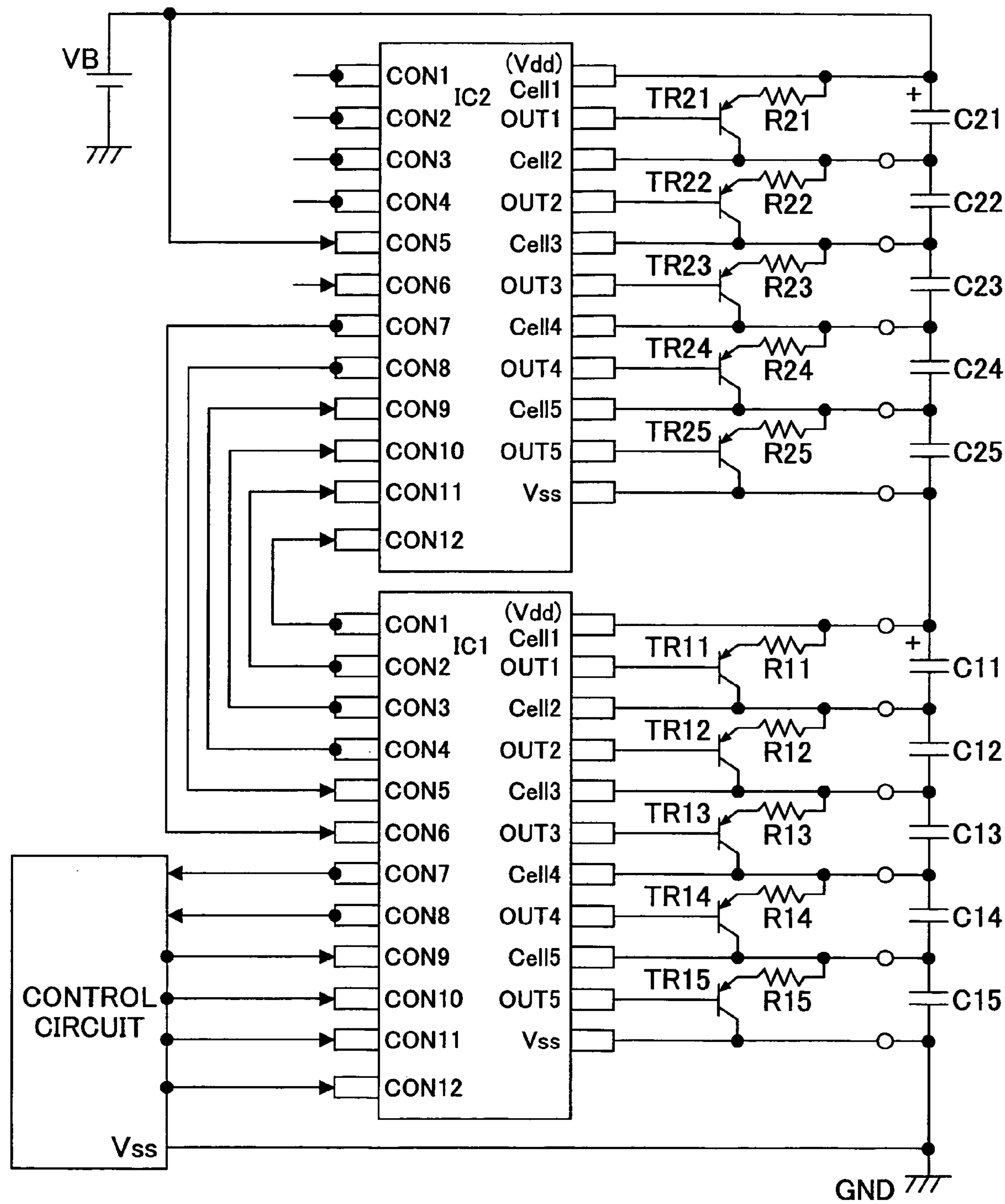
FIG. 1 is a circuit diagram showing signal flow in an exemplary circuit in which two semiconductor apparatuses according to an embodiment are cascaded.

FIG. 1 is a circuit diagram showing the case in which two monitor ICs according to an embodiment are cascaded. The signal flow between a control circuit and the monitor ICs is described below with reference to FIG. 1. Terminals CON1-12 at the left side of each monitor IC IC1-2 are control terminals for controlling charge. The terminal to which a black dot is indicated is an output terminal, and the terminal to which an arrow is indicated is an input terminal. Neither a black dot nor an arrow is indicated to the terminals at the right side of each monitor IC which are used for controlling the bypass of a capacitor. The arrows indicated on connections between the control circuit and the monitor IC1 and between the monitor IC1 and the monitor IC2 indicate the directions in which signals flow.

There are two types of signal flow. The first type is signal flow from the control circuit to the monitor IC1, and from the monitor IC1 to the monitor IC2. This type of signal flow is referred to as "upstream" signal. In FIG. 1, the terminals CON9-12 and CON1-4 correspond to this type of signal flow. The second type is signal flow from the monitor IC2 which is at high voltage side to the monitor IC1 which is at low voltage side, and from the monitor IC1 to the control circuit. This type of signal flow is referred to as "downstream" signal. In FIG. 1, the terminals CON5-8 corresponds to this type of signal flow.

FIGS. 2A and 2B are circuit diagrams each showing a circuit structure around the control terminal.

FIG. 2A shows a circuit for upstream signal used for the upstream signal terminal according to an embodiment. This circuit includes a low voltage side IC connection input terminal and a high voltage side IC connection output terminal. The low voltage side IC connection input terminal is pulled up to the plus power supply voltage Vdd of the monitor IC by a pull-up resistance R1.

The low voltage side IC connection input terminal is connected to the gate of a PMOS transistor M1. The source of the PMOS transistor M1 is connected to the plus power supply voltage Vdd, and the drain thereof is connected to the minus power supply voltage Vss via a resistance R2. The node between the drain of the PMOS transistor M1 and the resistance R2 is connected to the inside of the monitor IC as a control signal, and connected to the gate of a NMOS transistor M2. The source of the NMOS transistor M2 is connected to the minus power supply voltage Vss, and the drain thereof is connected to the high voltage side IC connection output terminal.

Specifically, the terminals CON9-12 shown in FIG. 1 are the low voltage side IC connection input terminals, and the terminals CON4-1 shown in FIG. 1 are the high voltage side IC connection output terminals corresponding to the respective low voltage side IC connection input terminals.

FIG. 2B shows a downstream signal circuit used for the downstream signal terminal according to an embodiment.

This circuit includes a high voltage side IC connection input terminal and a low voltage side IC connection output terminal. The high voltage side IC connection input terminal is pulled down to the minus power supply Vss of the monitor IC via a pull-down resistance R3.

The high voltage side IC connection input terminal is connected to the gate of the NMOS transistor M3. The source of the NMOS transistor M3 is connected to the minus power supply voltage Vss, and the drain thereof is connected to the plus power supply Vdd via a resistance R4. The source and drain of the NMOS transistor M4 are connected to the source and drain of the NMOS transistor M3, respectively. A signal output from the inside of the monitor IC is fed to the gate of a NMOS transistor M4 as an alarm signal. The node between the drain of the NMOS transistor M3 and the resistance R4 is connected to the gate of a PMOS transistor M5. The source of the PMOS transistor M5 is connected to the plus power supply voltage Vdd, and the drain thereof is connected to the low voltage side IC connection output terminal.

Specifically, in FIG. 1, the terminals CON5 and 6 correspond to the high voltage side IC connection input terminal, and the terminals CON8 and 7 correspond to the low voltage side IC connection output terminal.

Figure 3A:
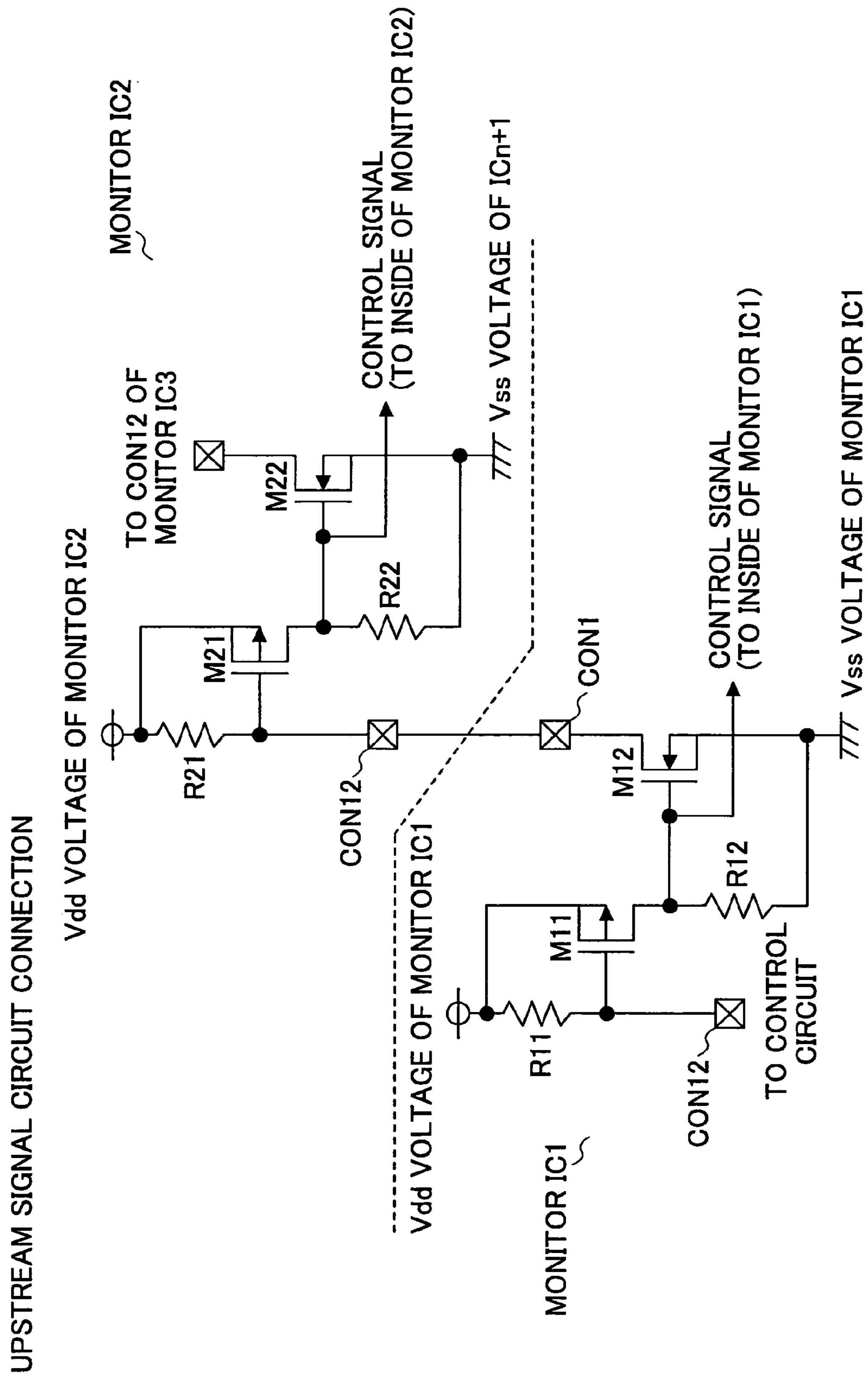
FIGS. 3A and 3B are circuit diagrams showing the connection of control terminals according to an embodiment.
Figure 3B:
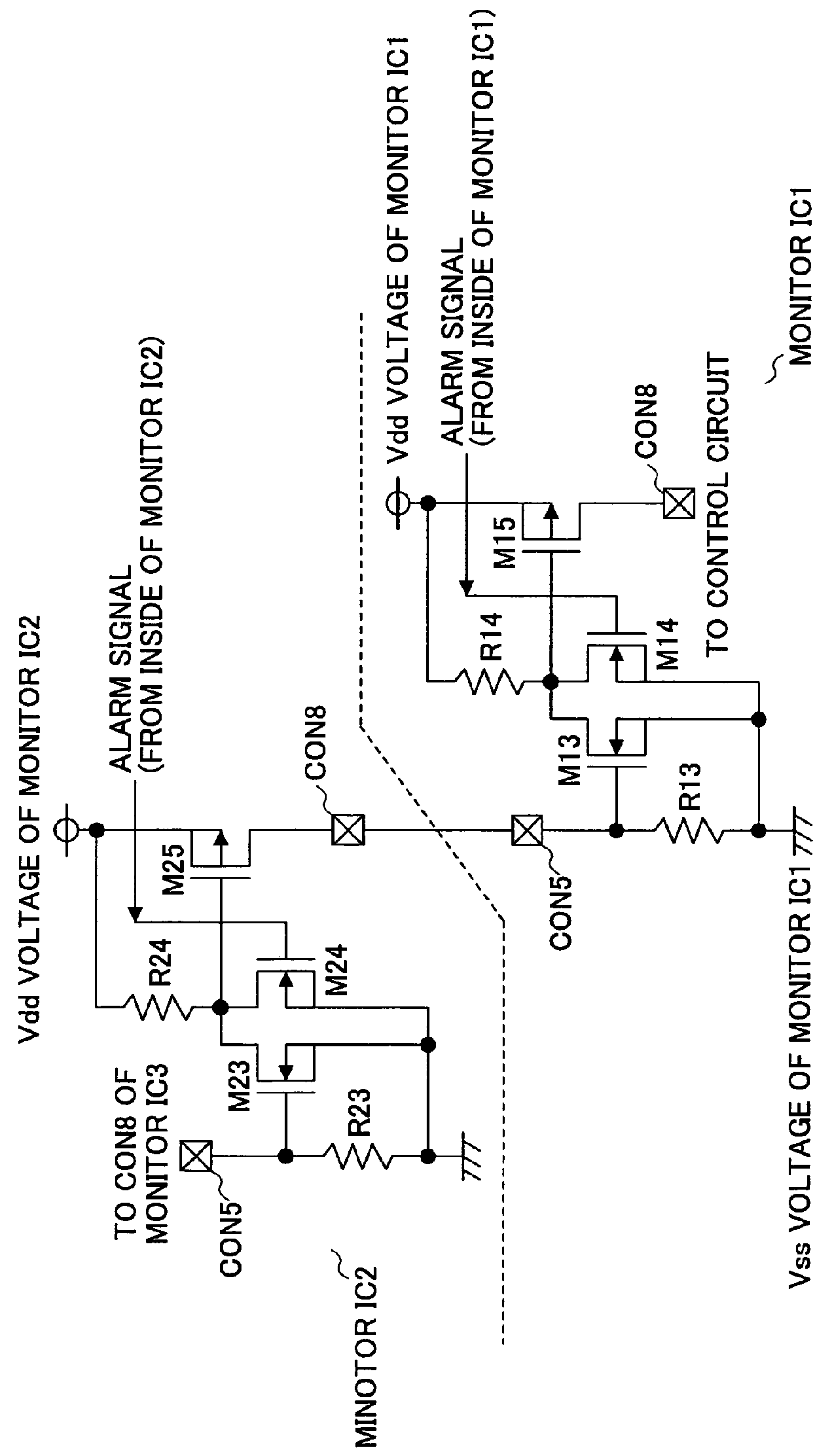
Figure 4:
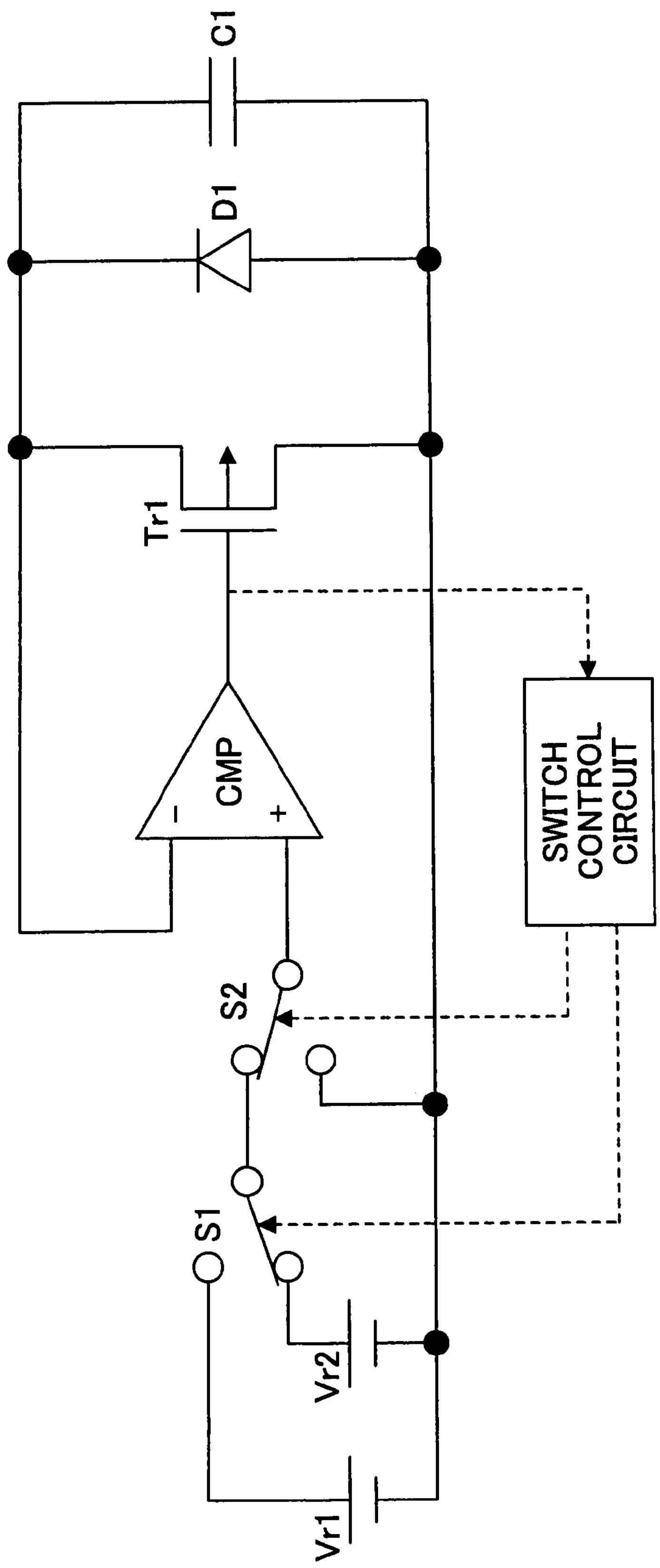
FIG. 4 is a circuit diagram for explaining a conventional monitor circuit.

FIGS. 3A and 3B are circuit diagrams showing the connection of control terminals according to an embodiment.

FIG. 3A shows a circuit in which the upstream signal terminals of the monitor IC1 and the monitor IC2 are connected in daisy chain. The circuit is divided into two portions by a broken line, in which the portion above the broken line is the upstream signal circuit of the monitor IC2 and the portion below the broken line is the upstream signal circuit of the monitor IC1. Although FIG. 3A shows the terminals CON1 and CON12, the terminals CON2 and CON11, CON3 and CON10, CON4 and CON9 can be connected in the same manner.

When a low level signal is fed to the low voltage side IC connection input terminal CON12 of the monitor IC1 from the control circuit, the PMOS transistor M11 is turned on, and the gate voltage of the NMOS transistor M12 is increased. Consequently, the NMOS transistor M12 is also turned on. As a result, a low level voltage is output from the high voltage side IC connection output terminal CON 1.

Since the high voltage side IC connection output terminal CON 1 of the monitor IC 1 and the low voltage side IC connection input terminal CON 12 of the monitor IC 2 are connected, the low voltage side IC connection input terminal CON 12 of the monitor IC 2 is turned to low level. As a result, the monitor IC 2 operates in the exactly same manner as the monitor IC 1 as described above. The high voltage side IC connection output terminal CON 1 of the monitor IC 2 also outputs low level.

The case in which only two monitor IC 1 and IC 2 are cascaded is described above. However, in the case in which more than two monitor ICs are cascaded, the low level signal output by the control circuit can be transferred via each monitor IC as described above.

In the case in which the monitor IC 1 and the monitor IC 2 are cascaded, the drain of the NMOS transistor M12 of the monitor IC 1 is connected to the plus power supply Vdd of the monitor IC 2 via a resistance R21 of the monitor IC 2. While the NMOS transistor M12 is turned off, the drain of the NMOS transistor M12 is provided with the plus power supply Vdd of the monitor IC 2.

Since the power supply voltage (Vdd-Vss) of the monitor IC 1 and the power supply voltage (Vdd-Vss) of the monitor IC 2 are substantially equal, voltage twice as high as the power supply voltage (Vdd-Vss) of the monitor IC 1 is applied between the source and drain of the NMOS transistor M12.

In addition, the gate of the PMOS transistor M21 of the monitor IC 2 is connected to the drain of the NMOS transistor M12 of the monitor IC 1 via the connection terminal. Because the minus power supply voltage Vss of the monitor IC 1 is applied to the gate of the PMOS transistor M21 while the NMOS transistor M12 is on, voltage twice as high as the power supply voltage (Vdd-Vss) of the monitor IC 2 is also applied to the gate of the PMOS transistor M21.

However, the gate voltage of the NMOS transistors M12 and M22 that is sent to the inside of the monitor IC as a control signal is within the range of the power supply voltage of each monitor IC. The internal circuit of the monitor IC does not need to be made with transistors of high withstanding voltage.

That is, it is understood that only transistors M11, M12, M21, and M22 that are directly connected to terminals for input/output the control signal need to be of high withstanding voltage. Additionally, the voltage twice as high as the power supply voltage of the monitor IC n is applied to the gate of the transistors M11 and M22, but only the voltage within the range of the power supply of the monitor IC n is applied between the source and drain thereof. It suffices that the gate dielectric film is of high withstanding voltage.

FIG. 3B shows a circuit in which the downstream terminals of the monitor IC 1 and the monitor IC 2 are connected in daisy chain. The circuit is divided into two portion by a broken line. The upper portion above the broken line is the downstream signal circuit of the monitor IC 2, and the lower portion below the broken line is the downstream signal circuit of the monitor IC 1. Although a circuit including CON 5 and CON 8 is shown in FIG. 3B, a circuit including CON 6 and CON 7 is the same.

When a high level signal is input to the high voltage side IC connection input terminal CON 8 of the monitor IC 2, the NMOS transistor M23 is turned on. The gate voltage of the PMOS transistor M25 is lowered, and the PMOS transistor M25 is also turned on. As a result, the low voltage side IC connection output terminal CON 8 outputs a high level signal.

If the alarm signal from the internal circuit of the monitor IC 2 becomes high level, the NMOS transistor M24 is turned on. Because the gate voltage of the PMOS transistor M25 is lowered, the PMOS transistor M25 is also turned on. As a result, the low voltage side IC connection output terminal CON 8 outputs a high level signal. Thus, in the case of the downstream circuit, a high level signal can be output to the low voltage side IC connection output terminal as the alarm signal output from the internal circuit of a monitor IC in the middle of the cascade.

Since the low voltage side IC connection output terminal CON 8 of the monitor IC 2 is connected to the high voltage side IC connection input terminal CON 5 of the monitor IC 1, the high voltage level IC connection input terminal CON 5 of the monitor IC 1 becomes high level. Consequently, the monitor IC 1 operates in the exactly same manner as the monitor IC 2 does, and the low voltage side IC connection output terminal CON 8 of the monitor IC 1 also outputs a high level signal.

The case in which only two monitor IC 1 and the monitor IC 2 are included is described above. Even in the case in which more than two monitor IC's are cascaded, the high level signal output from a monitor IC at the high voltage side can be sent to the control circuit via each monitor IC.

When the monitor IC 1 and the monitor IC 2 are cascaded, the drain of the PMOS transistor of the monitor IC 2 is connected to the minus power supply Vss of the monitor IC 1. Therefore, because the minus power supply voltage Vss of the monitor IC 1 is applied to the drain of the PMOS transistor M25 while the PMOS transistor M25 is turned off, the voltage twice as high as the power supply voltage of the monitor IC 2 is applied between the source and drain of the PMOS transistor M25.

The gate of the NMOS transistor M13 of the monitor IC 1 is connected to the drain of the PMOS transistor M25 of the monitor IC 2. Consequently, while the PMOS transistor M25 is turned on, the plus power supply voltage Vdd of the monitor IC 2 is applied to the gate of the NMOS transistor M13. It is understood that the voltage twice as high as the power supply voltage of the monitor IC 1 is applied to the gate of the NMOS transistor M13.

However, since the alarm signal provided to the gate of the NMOS transistor M14 can be within the range of power supply voltage of the monitor IC, the internal circuit of the monitor IC can be designed without using transistors of high withstanding voltage.

That is, only transistors M23, M25, M13, and M15 that are directly connected to the terminals for input and output the control signal need to be made of high withstanding voltage. Additionally, in the case of M23, the voltage twice as high as the power supply voltage of the monitor IC n is applied to the gate, but only the voltage within the range of power supply voltage is applied between the source and drain. Therefore, it suffices that the gate dielectric film is designed to be of high withstanding voltage.

Figure 5:
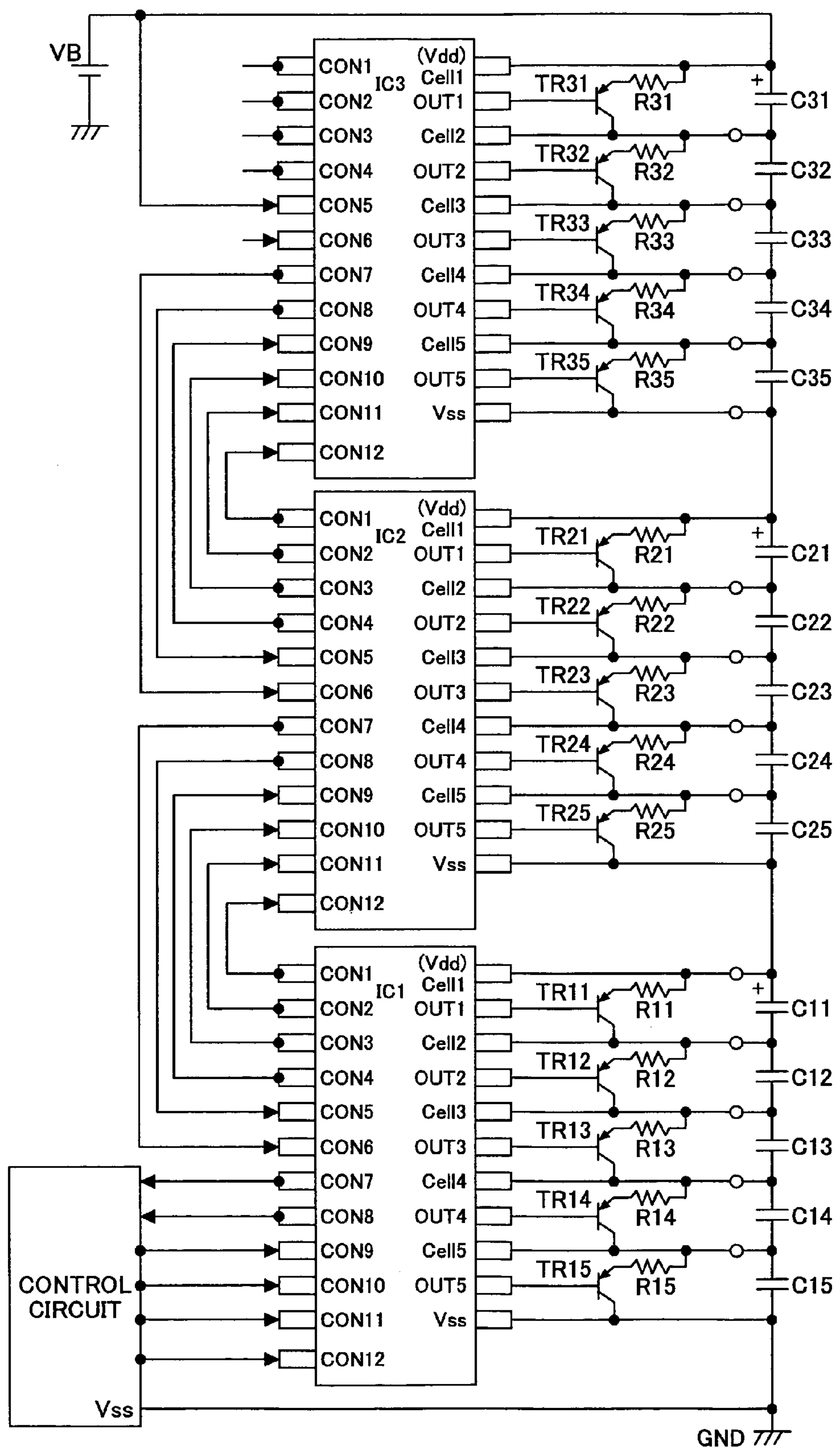
FIG. 5 is a circuit diagram showing signal flow in an exemplary circuit in which three semiconductor apparatuses according to an embodiment are cascaded.

FIG. 5 is a circuit diagram showing a circuit in which three semiconductor apparatuses according to an embodiment are cascaded.

In the case of cascading three semiconductor apparatuses according to an embodiment, terminals CON 1 and CON 12, CON 2 and CON 11, CON 3 and CON 10, CON 4 and CON 9 are connected in daisy chain in the upstream signal circuit from the monitor IC 1 to the monitor IC 3. In the downstream signal circuit from the monitor IC 3 to the monitor IC 1, terminals con7 and CON 6, and CON 8 and CON 5 are connected in daisy chain.

In this case, the terminals CON 9-CON 12 are the low voltage side IC connection input terminals of the upstream signal circuit, and the terminals CON 4-CON 1 are the corresponding high voltage side IC connection output terminals.

The terminals CON 5 and CON 6 are the high voltage side IC connection input terminal of the download signal circuit, and the terminals CON 8 and CON 7 are the corresponding low voltage side IC connection output terminals.

Figure 6:
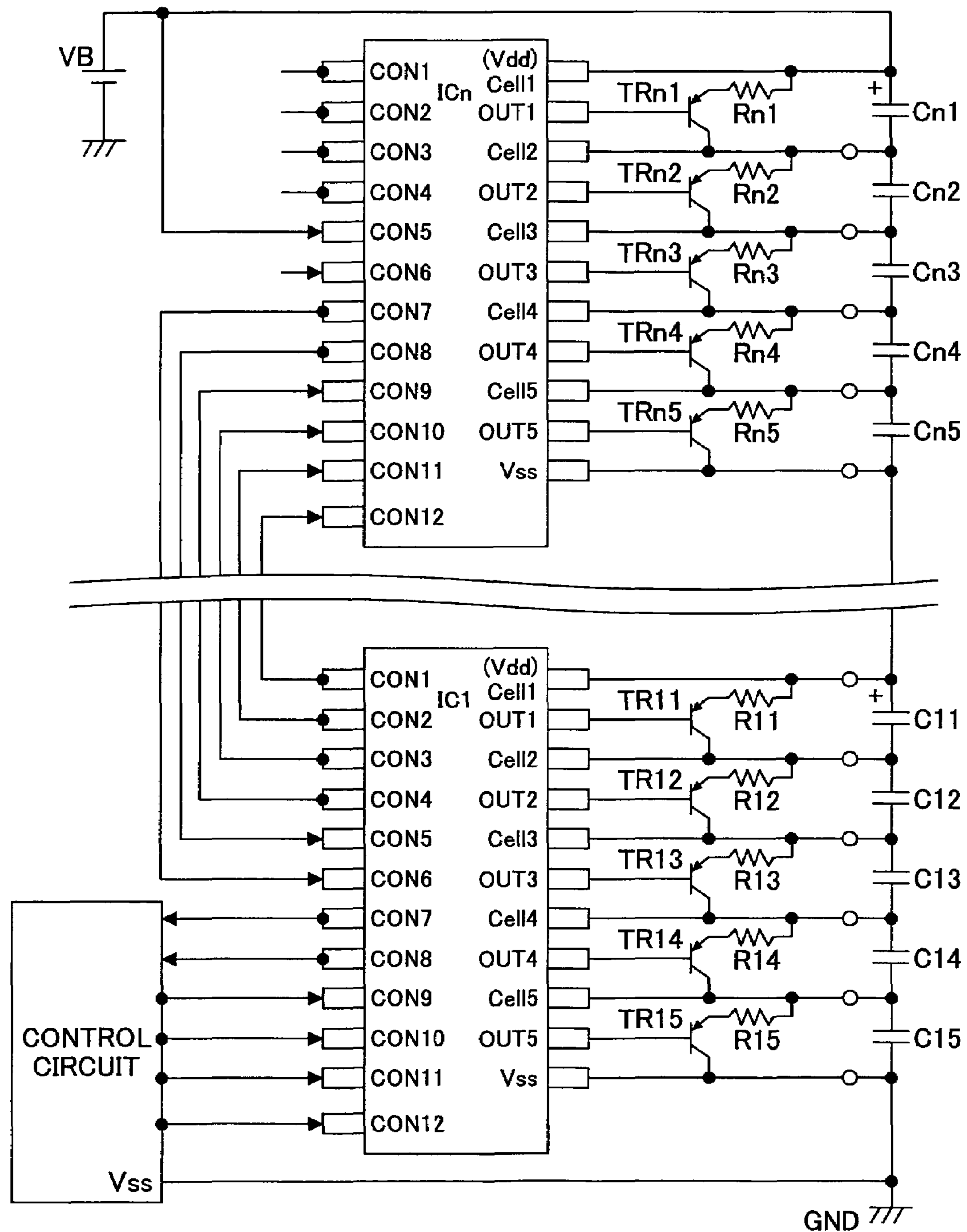
FIG. 6 is a circuit diagram showing signal flow in an exemplary circuit in which "n" semiconductor apparatuses according to an embodiment are cascaded.

FIG. 6 is a circuit diagram showing the case in which n semiconductor apparatuses according to an embodiment are cascaded.

In the case of "n" semiconductor apparatuses being cascaded, terminals CON 1 and CON 12, CON 2 and CON 11, CON 3 and CON 10, CON 4 and CON 9 are connected in daisy chain in the upstream circuit as the case of two or three semiconductor apparatuses being cascaded. In the downstream circuit, terminals CON 7 and CON 6, CON 8 and CON 5 are connected in daisy chain.

Figure 7A:
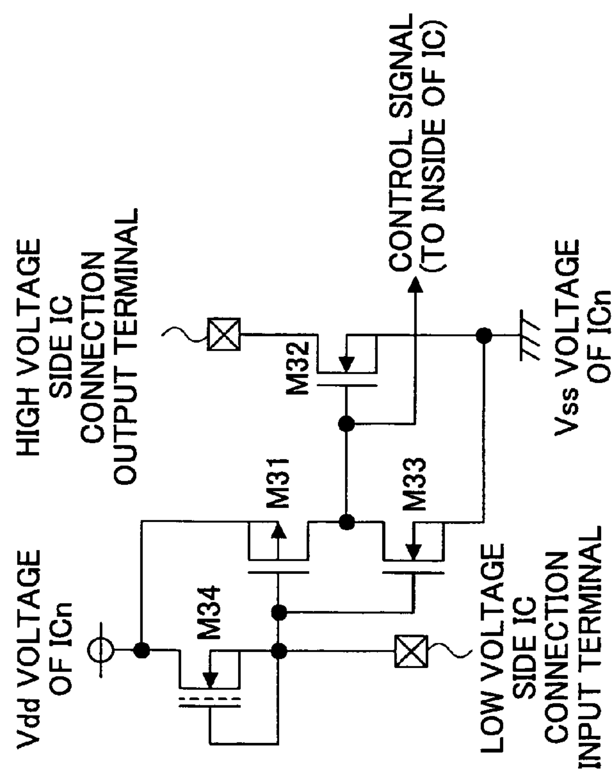
FIGS. 7A and 7B are circuit diagrams showing an exemplary circuit according to an embodiment in which resistances shown in FIG. 2 replaced with transistors.
Figure 7B:
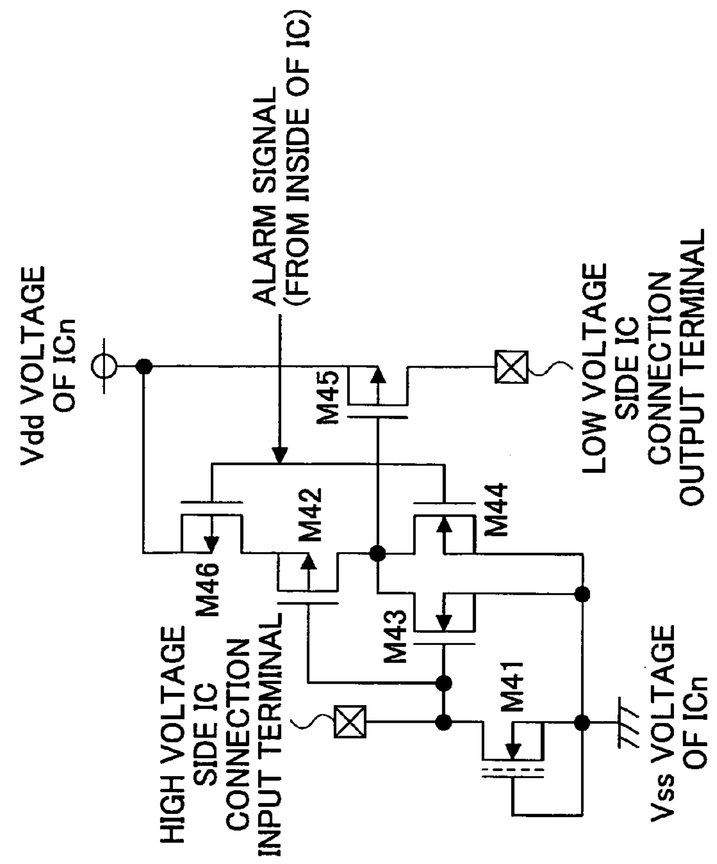

FIGS. 7A and 7B are circuit diagram in the case in which the resistances of FIG. 2 are replaced with transistors.

In FIG. 7A, the resistance R1 is replaced with a NMOS transistor M34, and the resistance R2 is replaced with a NMOS transistor M33. In this case, it suffices that transistors M31, M32, M33, and M34 in the upstream signal circuit are made high withstanding voltage transistors. Additionally, in the case of transistors M31 and M33, voltage twice as high as the power supply voltage of the monitor IC n is applied only to the gate, but only voltage within the range of the power supply voltage of the monitor IC n is applied between the source and drain. Accordingly, it suffices that only the gate dielectric film needs to be specified as being high withstanding voltage.

In FIG. 7B, the resistance R3 is replaced with a NMOS transistor M41, and the resistance R4 is replaced with a NMOS transistor M46. Transistors M41, M42, M43, and M45 need to be of high withstanding voltage. In the case of the transistors M42 and M43, voltage twice as high as the power supply voltage of the monitor IC n is applied to the gate, but voltage that is applied between the source and drain is the power supply voltage of the monitor IC n. As a result, only the gate dielectric film of the gate needs to be of high withstanding voltage.

Figure 8A:
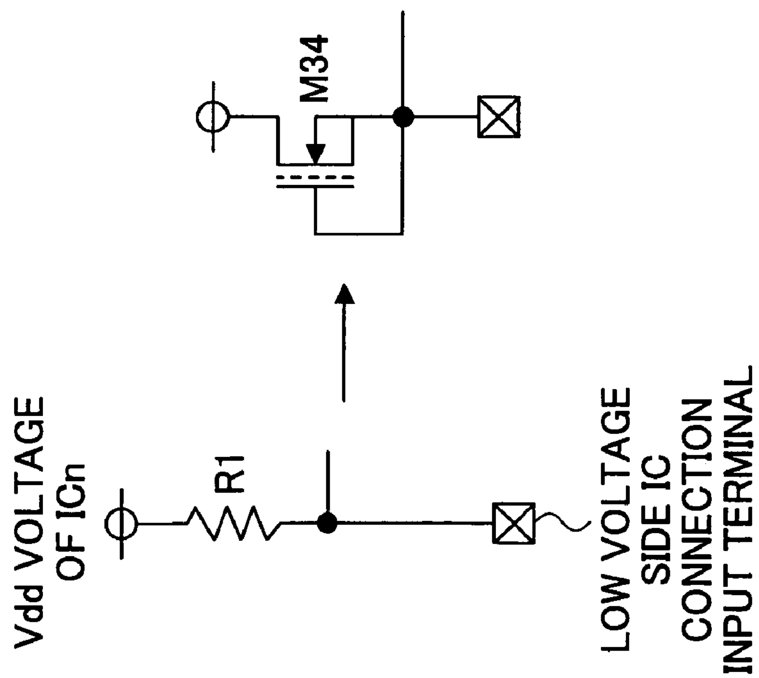
FIGS. 8A and 8B are diagrams for explaining the resistances of FIG. 2 and the input pull-down/pull-up resistance of transistors of FIG. 7.
Figure 8B:
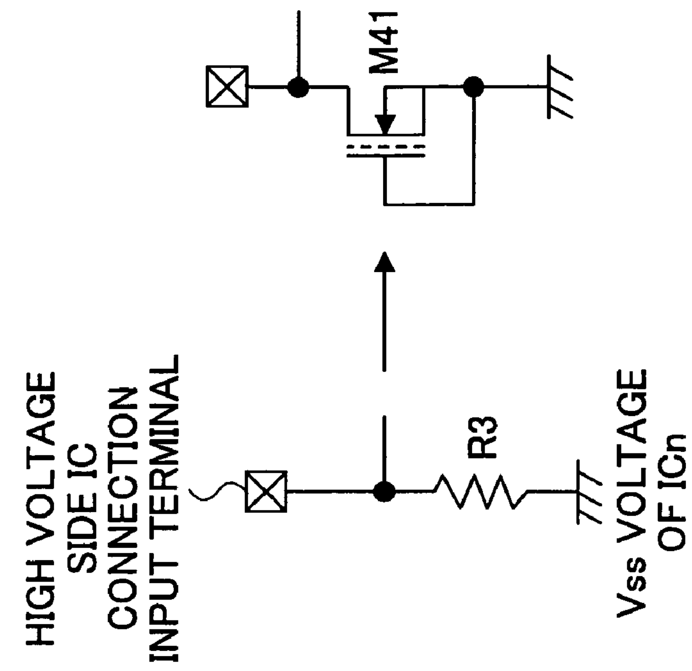

FIGS. 8A and 8B are circuit diagrams for explaining the input pull-down/pull-up portions configured with the resistances of FIG. 2 and the transistors of FIG. 7.

The resistances R1 and R3 in FIG. 2 need to be high so as to reduce current that flows through the resistances. For example, if 5 V is applied to the resistance but the current needs to be reduced to 1 μA, the resistance needs to be 5 MΩ.

The chip area required in the case the resistance is constructed by N channel depletion transistor M34 or M41 as shown in FIG. 8 is less than the chip area required in the case the resistance is constructed by usual resistor. Even in the case in which higher voltage is applied, the resistance constructed by the N channel depletion transistor little depends on the power supply voltage.

As shown in FIGS. 7A and 7B, the high voltage side IC connection output terminal is a N channel open drain. The high voltage side IC connection input terminal is the opposite terminal of a high resistance component connected to Vss, and is an inverter input terminal. The low voltage side IC connection output terminal is P channel open drain. The low voltage side IC connection input terminal is the opposite terminal of a high resistance component connected to Vdd, and an inverter input terminal.

If the N channel open drain of the high voltage side IC connection output terminal of IC n is on, the high voltage side IC connection output terminal of the IC n becomes Vss voltage level of the IC n. When the corresponding low voltage side IC connection input terminal of IC n+1 receives the low signal of IC n, a little current flows through the high resistance component connected to Vdd of IC n+1, but the low signal is fed to the inverter input. The signal is further transferred to the internal circuit of IC n+1, and the N channel open drain of the high voltage side IC connection output terminal of IC n+1 is turned on. The signal is further transferred to IC n+2.

In the case in which the N channel open drain of the high voltage side IC connection output terminal of IC n is off, although the high voltage side IC connection output terminal of IC n itself is floating, the high voltage side IC connection output terminal of IC n becomes Vdd voltage of IC n+1 since the high voltage side IC connection output terminal of IC n is pulled by the high resistance component connected to the corresponding low voltage side IC connection input terminal of IC n+1, the high resistance component connected to Vdd. A high signal is fed to the inverter input of the low voltage side IC connection input terminal of IC n+1. The signal is transferred through the internal circuit of IC n+1, and the N channel open drain of the high voltage side IC connection output terminal of IC n+1 is turned off. The signal is further transferred to IC n+2.

In FIG. 7B, when the P channel open drain of the low voltage side IC connection output terminal of IC n is on, the low voltage side IC connection output terminal of IC n becomes Vdd voltage level of IC n. When the high voltage side IC connection input terminal of IC n−1 receives a high signal of IC n, a little current flows through the high resistance component connected to Vss of IC n−1, but a high signal is fed to the inverter input. The signal is transferred through the IC n−1, and the P channel open drain of the low voltage side IC connection output terminal of IC n−1 is turned on. The signal is further transferred to IC n−2.

In the case in which the P channel open drain of the low voltage side IC connection output terminal of IC n is off, although the low voltage side IC connection output terminal of IC n itself is floating, the low voltage side IC connection output terminal of IC n becomes Vss voltage of IC n−1 since the low voltage side IC connection output terminal of IC n−1 is pulled by the high resistance component connected to the corresponding high voltage side IC connection input terminal of IC n−1, the high resistance component connected to Vss. A low signal is fed to the inverter input of the high voltage side IC connection input terminal of IC n−1. The signal is transferred through the internal circuit of IC n−1, and the P channel open drain of the low voltage side IC connection output terminal of IC n−1 is turned off. The signal is further transferred to IC n−2. The construction of the control terminal is not limited to the technique and system described above. Those skilled in the art will recognize various modifications to the present invention without departing from the scope of the appended claims.

The present invention is applicable to a semiconductor apparatus having any suitable type of terminals such as pin insertion type and surface mount type. An example of the surface mount type may include ball grid type, gull-wing lead type, and J lead type.

The present invention also is applicable to a semiconductor apparatus embedded in any suitable package having opposing edges at which leads are disposed. An example of the package may include DIP, PGA, SOP, QFP, BGA, and CSP.

As described above, in the case of a semiconductor apparatus according to an embodiment, only the transistors directly connected to the control signal terminals connected in daisy chain is constructed with transistors of high withstanding voltage more than twice as high as the power supply voltage. According to the above arrangements, the chip area of the semiconductor apparatus is little increased, which results in preventing chip cost from increasing.

The preferred embodiments of the present invention are described above. The present invention is not limited to these embodiments, but variations and modifications may be made without departing from the scope of the present invention.

This patent application is based on Japanese priority patent application No. 2004-84620 filed on Mar. 23, 2004, the entire contents of which are hereby incorporated by reference.

What is claimed is:

1. A semiconductor apparatus, comprising:

a plurality of parallel monitor circuits each configured to control charge to a capacitor by controlling a transistor that bypasses, if the voltage of the capacitor exceeds a predetermined reference voltage, charge current provided to the capacitor;

a plurality of high voltage side IC connection output terminals each connected to an open drain of a corresponding N channel transistor;

a plurality of high voltage side IC connection input terminals each connected to a terminal of a corresponding first high resistance component, an opposite terminal of each first high resistance component being connected to a minus power supply of the semiconductor apparatus, and to a corresponding inverter input terminal;

a plurality of low voltage side IC connection output terminals each connected to an open drain of a corresponding P channel transistor; and a plurality of low voltage side IC connection input terminals each connected to a terminal of a corresponding second high resistance component, an opposite terminal of each second high resistance component being connected to a plus power supply of the semiconductor apparatus, and to a corresponding inverter input terminal, wherein when the open drain of the N channel transistor of one of the high voltage side IC connection output terminals is turned on, the high voltage side IC connection output terminal becomes the minus power supply voltage of the semiconductor apparatus;

when a low signal is input to one of the low voltage side IC connection input terminals, a little current flows to the corresponding second high resistance component connected to the plus power supply of the semiconductor apparatus, and a low signal is input to the corresponding inverter input; and the first and second high resistance components are distinct elements from the N channel and P channel transistors.

2. The semiconductor apparatus as claimed in claim 1, wherein the P channel transistors of the low voltage side IC connection output terminals and the N channel transistors of the high voltage side IC connection output terminals have withstanding voltage twice or more as high as the power supply voltage of the semiconductor apparatus.

3. The semiconductor apparatus as claimed in claim 1, wherein the P channel transistors of the low voltage side IC connection output terminals and the N channel transistors of the high voltage side IC connection output terminals have withstanding voltage twice or more as high as the power supply voltage of the semiconductor apparatus; and the inverters include a transistor, only the gate dielectric film of which is made thick.

4. The semiconductor apparatus as claimed in claim 1, wherein the first high resistance components of the high voltage side IC connection input terminals, the second high resistance components of the low voltage side IC connection input terminals, or both are replaced with the drain and source of an N channel depletion transistor.

5. The semiconductor apparatus as claimed in claim 1, wherein when the open drain of the N channel transistor of one of the high voltage side IC connection output terminals is turned off, the high voltage side IC connection output terminal becomes the plus power supply voltage level of a high voltage side semiconductor apparatus by being pulled up to the plus power supply voltage level via the corresponding second high resistance component.

6. The semiconductor apparatus as claimed in claim 1, wherein when the open drain of the P channel transistor of one of the low voltage side IC connection output terminals is turned on, the low voltage side IC connection output terminal becomes the plus power supply voltage of the semiconductor apparatus; and when a high signal is input to one of the high voltage side IC connection input terminals, a little current flows to the first high resistance component connected to the minus power supply of the semiconductor apparatus, and a high signal is input to the corresponding inverter input.

7. The semiconductor apparatus as claimed in claim 1, wherein when the open drain of the P channel transistor of one of the low voltage side IC connection output terminals is turned off, the low voltage side IC connection output terminal becomes the minus power supply voltage level of a low voltage side semiconductor apparatus by being pulled down to the minus power supply voltage level via the corresponding first high resistance component.

8. The semiconductor apparatus as claimed in claim 1, wherein the low voltage side IC connection input terminals are pulled up to the plus power supply voltage level;

the low voltage side IC connection input terminals are connected to a gate of a PMOS transistor, the source of the PMOS transistor being connected to the plus power supply, the drain of the PMOS transistor being connected to the minus power supply via a resistance;

a node between the drain of the PMOS transistor and the resistance is connected to an internal circuit of the semiconductor apparatus as a control signal, and to the gate of the NMOS transistor;

the source of the NMOS transistor is connected to the minus power supply voltage, and the drain of the NMOS transistor is connected to the plus power supply voltage.

9. The semiconductor apparatus as claimed in claim 1, wherein the high voltage side IC connection input terminals are pulled down to the minus power supply voltage level;

the high voltage side IC connection input terminals are connected to a gate of a NMOS transistor, the source of the NMOS transistor being connected to the minus power supply, the drain of the NMOS transistor being connected to the plus power supply via a resistance;

the source and drain of the NMOS transistor are connected to the source and drain, respectively, of the NMOS transistor;

an output signal from an interior of the semiconductor apparatus is connected to the gate of the NMOS transistor as an alarm signal;

a node between the drain of the NMOS transistor and the resistance is connected to the gate of the PMOS transistor; and the source of the PMOS transistor is connected to the plus power supply, and the drain of the PMOS transistor is connected to the low voltage side IC connection output terminals.

10. The semiconductor apparatus of claim 1, wherein each corresponding first high resistance component is a resistor directly connected to the minus power supply of the semiconductor apparatus.

11. The semiconductor apparatus of claim 1, wherein each corresponding second high resistance component is a resistor directly connected to the plus power supply of the semiconductor apparatus.

12. The semiconductor apparatus of claim 1, wherein each corresponding first high resistance component is an NMOS transistor that is connected to the corresponding inverter input terminal.

13. The semiconductor apparatus of claim 1, wherein each corresponding second high resistance component is an NMOS transistor that is connected to the corresponding inverter input terminal.

14. The semiconductor apparatus of claim 1, wherein each corresponding first high resistance component is connected between the minus power supply and a high voltage side IC connection input terminal, while each P channel transistor is connected between the plus power supply and a low voltage side IC connection output terminal.

15. The semiconductor apparatus of claim 1, wherein each corresponding second high resistance component is connected between the plus power supply and a low voltage side IC connection input terminal, while each N channel transistor is connected between the low power supply and a high voltage side IC connection output terminal.

* * * * *